(12) United States Patent
Lu et al.

(10) Patent No.: US 7,979,211 B2
(45) Date of Patent: Jul. 12, 2011

(54) ELECTROMAGNETIC DATA PROCESSING SYSTEM

(75) Inventors: Xinyou Lu, Missouri City, TX (US); Dennis E. Willen, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 153 days.

(21) Appl. No.: 12/304,699

(22) PCT Filed: Jul. 5, 2007

(86) PCT No.: PCT/US2007/015495
§ 371 (c)(1),
(2), (4) Date: Dec. 12, 2008

(87) PCT Pub. No.: WO2008/024153
PCT Pub. Date: Feb. 28, 2008

(65) Prior Publication Data
US 2009/0126939 A1 May 21, 2009

Related U.S. Application Data

(60) Provisional application No. 60/839,784, filed on Aug. 24, 2006.

(51) Int. Cl.
*G01V 1/48* (2006.01)
*G01V 1/46* (2006.01)
*G01V 3/00* (2006.01)
*G01R 13/02* (2006.01)
*G01R 23/00* (2006.01)

(52) U.S. Cl. ............... 702/16; 702/13; 702/68; 702/76; 324/365

(58) Field of Classification Search ................. 166/66.5, 166/248; 702/1, 2, 6, 7, 9, 11–14, 65, 75, 702/76, 189, 190; 340/854.6, 854.8; 324/365
See application file for complete search history.

(56) References Cited

U.S. PATENT DOCUMENTS 6,229,546 B1 * 5/2001 Lancaster et al. ............. 345/419
6,754,890 B1   6/2004 Berry et al.
(Continued)

FOREIGN PATENT DOCUMENTS

GB    2 415 511    12/2005
(Continued)

OTHER PUBLICATIONS

Allen, J. (1977), "A Unified Approach to Short-Time Fourier Analysis and Synthesis," *Proc. Of the IEEE* 65, pp. 1558-1564.

(Continued)

*Primary Examiner* — Michael P Nghiem
*Assistant Examiner* — Ricky Ngon

(57) ABSTRACT

Method and computer program for accepting controlled-source electromagnetic ("CSEM") source and receiver data (40) as time series, transforming these data into the time-frequency domain, and reducing these data and survey metadata to a form suitable for interpretation or inversion. The invention includes: a number of processing tools or programs (30), each designed to take a specific action on CSEM data or metadata, combine data types in some way, and/or provide a visual representation of data; a Graphical User Interface (32) to specify the action of specific tools (34) on specific data, supply parameters to tools, and monitor progress of the processing project; and a specified common internal data format, so that processing tools may be applied in various orders (36) during different processing flows and processed CSEM data can be passed on to interpretation or inversion systems.

17 Claims, 6 Drawing Sheets

U.S. PATENT DOCUMENTS

| | | |
|---|---|---|
| 6,907,348 B2 | 6/2005 | Gaston et al. |
| 2005/0140373 A1 | 6/2005 | Li et al. |
| 2005/0251340 A1 | 11/2005 | Tompkins |

FOREIGN PATENT DOCUMENTS

| | | |
|---|---|---|
| WO | WO 2007/018810 | 2/2007 |

OTHER PUBLICATIONS

Alumbaugh, et al. (1997), "3-D massively parallel electromagnetic inversion—Part II. Analysis of a cross well experiment," *Geophysical J. Intl.* 128, pp. 355-363.

Behrens, J.P. (2005), The Detection of Electrical Anisotropy in 35 Ma Pacific Lithosphere: Results from a Marine Controlled-Source Electromagnetic Survey and Implications of the Upper Mantle, Ph.D. Thesis, University of California, San Diego.

Carazzone, J.J. et al. (2005), "Three Dimensional Imaging of Marine CSEM Data," *Extended abstracts of the 75th Annual International meeting*, Society of Exploration Geophysics, pp. 575-578.

Choi, H. et al. (1989), "Improved time-frequency representation of multicomponent signals using exponential kernels," *IEEE Trans. On Acoust., Speech and Signal Processing* 37, pp. 862-871.

Chubak, G. et al. (2006), "Integrated software framework for processing of geophysical data," *Computers & Geosciences* 32, pp. 767-775.

Ellingsrud, et al. (2002), "Remote sensing of hydrocarbon layers by seabed logging (SBL): results from a cruise offshore Angola," *The Leading Edge* 21, pp. 972-982.

Guo, Z. et al. (1994), "The time-frequency distributions of nonstationary signals based on a Bessel kernel," *IEEE Trans. On Signal Proc.* 42, pp. 1700-1707.

Lang, W.C. et al. (1998), "Time-frequency analysis with the continuous wavelet transform," *Am. J. Phys.* 66, pp. 794-797.

MacGregor, L.M. et al. (1998), The Ramesses experiment-III. Controlled-source electromagnetic sounding of the Reykjanes Ridge at 57°45'N, *Geophys. J. Int.* 135, pp. 773-789.

Morozov, I.B. et al. (1997), "A New Sysem for Multicomponent Seismic Processing," *Computers & Geosciences* 23, pp. 689-706.

Morozov, I.B. (1998), "3D Seismic Processing Monitor," *Computers & Geosciences* 24, pp. 285-288.

Proubasta, D. (1983), "Electromagnetics in Petroleum Prospecting," *The Leading Edge* 2, pp. 36-40.

Spies, B.R. et al. (1991), "Electromagnetic Sounding," in Electromagnetic methods in Applied Geophysics, v. 2, M.N. Nabighian ed., Society of Exploration Geophysicists, pp. 285-426.

Wigner, E. (1932), "On the quantum correction for thermodynamic equilibrium," *Phys. Rev.* 40, pp. 749-759.

Stockwell, J.W. (1999), "The CWP/SU: seismic UN*x packaging," *Computers and Geosciences* 25, pp. 415-419.

Ville, J. (1948), "Theorie et application de la notion de signal analytique," *Cables et Transmission* 2A, pp. 61-74.

Yilmaz, O. (1987), "Seismic Data Processing," Society for Exploration Geophysicists, p. 56.

European Search Report dated Mar. 2, 2007 (RS 114397).

International Search Report & Written Opinion dated Feb. 28, 2008 for PCT/US2007/015495.

\* cited by examiner

ELECTROMAGNETIC DATA PROCESSING SYSTEM

This application is a National Stage entry under 35 U.S.C. 371 of PCT/US2007/015495 that published as WO 2008/024153 and was filed on Jul. 5, 2007 and claims the benefit of now expired U.S. Provisional application 60/839,784 which was filed on Aug. 24, 2006.

FIELD OF THE INVENTION

This invention relates generally to the field of geophysical prospecting and reservoir delineation, and more particularly to processing of electromagnetic data. Specifically, the invention is an improved method for flexible processing of electromagnetic data for resistivity mapping of a subterranean region.

BACKGROUND OF THE INVENTION

Controlled-source electromagnetic ("CSEM") surveys are becoming an important geophysical tool for evaluating the presence of hydrocarbon-bearing strata within the earth. CSEM surveys typically record the electromagnetic signal induced in the earth by a source (transmitter) and measured at one or more receivers. The behavior of this signal as a function of transmitter location, frequency, and separation (offset) between transmitter and receiver can be diagnostic of rock properties associated with the presence or absence of hydrocarbons. A notable diagnostic rock property of this kind is electrical resistivity. Thus, CSEM measurements are typically used to determine the spatially-varying resistivity of the subsurface.

In the marine environment, CSEM data are typically acquired by towing an electric dipole transmitting antenna 10 among a number of receivers 11 positioned on the seafloor 12 (FIG. 1). The receivers typically have multiple sensors designed to record different vector components of the electric and/or magnetic fields. The transmitter antenna is typically towed (by a vessel on the sea surface 13) a few tens of meters above the seafloor. The receivers are weighted and fall to the seafloor, but release their weight and rise back to the surface with the data after receiving an acoustic command from the ship. Alternative configurations include stationary transmitters on the seafloor or in the water column as well as magnetic transmitter antennae. The transmitting and receiving systems typically operate independently (without any connection between them), so that receiver data must synchronized with shipboard measurements of transmitter position by comparing clock times on the receivers to time from a shipboard or GPS (Global Positioning System) standard.

CSEM data are typically interpreted in the temporal frequency domain, each signal representing the response of the earth to electromagnetic energy at that temporal frequency. Temporal frequency domain means the data is transformed, typically by Fourier transformation, such that the dependence of the data on time becomes dependence on frequency. In raw data, the strength of each frequency component varies depending on how much energy the transmitter broadcasts (i.e., the amplitude of each component in the transmitter's frequency spectrum) and on the receiver sensitivity at that frequency. These transmitter and receiver effects are typically removed from the data prior to interpretation, thereby normalizing the receiver data by the transmitted signal and by the receiver sensitivity. FIGS. 2A-B depict raw receiver data 21 together with the transmitter waveform 22 that gave rise to it. FIG. 2A displays measured data on a time scale of several hours while FIG. 2B shows the received signal (and, for reference, the transmitted signal) on a much shorter time scale, comparable to the transmitter signal period, typically between 4 and 32 seconds. (The vertical scale applies only to the receiver signal.)

In practice, the receiver data are usually converted to temporal frequency by dividing (or "binning") the recorded time-domain data into time intervals ($x_1$, $x_2$, and $x_3$ in FIG. 3A) equal to the transmitter waveform period (FIG. 3A) and determining the spectrum within each bin by standard methods based on the Fourier transform (FIG. 3B). (The phases of the spectral components are not shown.) With each bin is associated a time, typically the Julian date at the center of the bin. Since the transmitter location is known as a function of time, these bins may be interchangeably labeled in several different ways: by Julian date of the bin center; by transmitter position; by the signed offset distance between source and receiver; or, by the cumulative distance traveled by the transmitter relative to some arbitrarily chosen starting point. In general, the received signals are made up of components both in-phase and out-of-phase with the transmitter signal. The signals are therefore conveniently represented as complex numbers in either rectangular (real-imaginary) or polar (amplitude-phase) form. The transmitter signal may be a more complex waveform than that depicted in FIGS. 2B and 3A.

Those skilled in the art of digital signal processing will know of techniques that will decompose time series, such as raw CSEM data, to temporal frequency without explicitly dividing the data into non-overlapping time intervals. In general, a time series may be transformed to the time-frequency domain and the dominant temporal frequencies extracted separately as functions of time. Some methods of transforming data to the time-frequency domain include the Short-Time Fourier Transform (J. Allen, L. Rabiner, "A Unified Approach to Short-Time Fourier Analysis and Synthesis," *Proc. of the IEEE* 65, 1558-64, (1977)); the Wavelet Transform (W. C. Lang and K. Forinash, "Time-frequency analysis with the continous wavelet transform," *Am. J. Phys.* 66, 794-797, (1998)); the Wigner-Ville transform (E. Wigner, On the quantum correction for thermodynamic equilibrium, *Phys. Rev.* 40, 749-759, (1932), and J. Ville, "Theorie et application de la notion de signal analytique," *Cables el Transmission*, 2A., 61-74, (1948)); the Choi-Williams transform (H. Choi and W. Williams, "Improved time-frequency representation of multicomponent signals using exponential kernels," *IEEE Trans. on Acoust, Speech, and Signal Processing*, 37, 862-871, (1989)); and the Bessel method (Z. Guo, L. G. Durand, and H. C. Lee, "The time-frequency distributions of nonstationary signals based on a Bessel kernel," *IEEE Trans. on Signal Proc.*, 42, 1700-1707, (1994)). The present invention is not limited to any particular method or methods for spectral decomposition of CSEM data to the temporal frequency domain.

The actual source current injected into the earth will generally deviate from an idealized waveform such as waveform 22 shown in FIG. 2B. Furthermore, the amplitude and shape of the actual waveform may be known with varying levels of precision. Accordingly, the normalization of CSEM receiver data ($R_{normalized}$) by the transmitted current may be carried out using any of several approximate methods. For example, the source waveform may be represented by:

a complex spectrum, $S_0(\omega)$, where $\omega$ is the temporal frequency in radians/sec. and $S_0(\omega)$, is assumed to remain constant from bin to bin. In this case, the receiver signal, $R(\omega,r)$, varies with time or offset, r, and would be normalized as $$R_{normalized}(\omega, r) = \frac{R(\omega, r)}{S_0(\omega)}; \tag{1}$$

a complex spectrum, $S_1(\omega,r)$, that does vary from bin to bin and the receiver normalized as $$R_{normalized}(\omega, r) = \frac{R(\omega, r)}{S_1(\omega, r)};\qquad(2)$$

the product of a complex spectrum, $S_2(\omega)$, that depends only on waveform type and a source current, $I_0$, that that is independent of offset. In this case, the receiver signal would be normalized as $$R_{normalized}(\omega, r) = \frac{R(\omega, r)}{I_0 S_2(\omega)};\qquad(3)$$

the product of a complex spectrum, $S_3(\omega)$, that depends only on waveform type and a source current, $I(r)$, that varies with offset. In this case, the receiver signal would be normalized as $$R_{normalized}(\omega, r) = \frac{R(\omega, r)}{I(r)S_3(\omega)}; \text{ and,}\qquad(4)$$

the product of a complex spectrum, $S_4(\omega)$, that depends only on waveform type, a source current, $I(r)$, that varies with offset, and a source phase, $\phi(\omega,r)$, that may vary from bin to bin. In this case, the receiver signal would be normalized as $$R_{normalized}(\omega, r) = \frac{R(\omega, r)}{I(r)S_4(\omega)e^{i\phi(\omega,r)}}.\qquad(5)$$

In addition to the current injected by the transmitter and the electric- and magnetic-field measurements at the receivers, other types of data and metadata (that is, documentation and information about the survey and about measured data) are also of importance to the analysis of CSEM surveys. Examples of metadata include:
  ocean conductivity as a function of depth;
  seafloor bathymetry;
  positions and orientations of the source antenna versus time;
  source spectrum;
  source waveform period;
  receiver locations in three dimensions;
  receiver response functions versus frequency (These functions, sometimes referred to as receiver calibrations, may combine several factors, such as the electronic properties of the amplifiers and digitizers as well as the characteristics of the electric and magnetic field antennae and may be measured in a laboratory removed from the site of the CSEM survey.);
  receiver configurations (the mapping of receiver antennae and receiver response functions to specific digital values in the recorded media);
  receiver orientations in three dimensions;
  timing measurements needed to estimate receiver clock drift; and,
  format specifications for both field-recorded and processed data.
CSEM data analysis may optionally involve inversion, which is the computation of one of more electromagnetic properties of the earth (resistivity, permeability, and permittivity) directly from the CSEM data. CSEM inversion is usually performed by iteratively updating an initial estimate of the earth's electromagnetic properties based on the mismatch between the measured data and synthetic data forward-modeled from the earth parameter estimates. See, for example, D. L. Alumbaugh and G. A. Newman, "3-D massively parallel electromagnetic inversion—Part II. Analysis of a cross well experiment", *Geophysical J, Int.* 128, 355-363 (1997) and J. J. Carazzone, O. M. Burtz, K. E. Green, D. A. Pavlov, and C. Xia, "Three-dimensional imaging of marine CSEM data", *Extended abstracts of the 75th Annual International meeting*, Society of Exploration Geophysics, 575-578 (2005). Because it results in a representation of the subsurface resistivity structures, this process is also known as CSEM imaging.

CSEM processing is organized around the application of distinct processes or tools that carry out some part of the overall data processing sequence or flow. A typical overall processing sequence is illustrated by the flow chart of FIG. 4. Some example tools are: display spectral data, re-format navigation data supplied by third parties, and noise suppression. Certain processing tools, such as data re-formatting and data merging, can often be carried out with little user direction and only minor checks for accuracy and consistency. Other tools, such as signal processing techniques, require the user to specify one or more parameters. The optimal choice of parameters is frequently data-dependent, so the data processor will typically try several parameter combinations before making a final selection. At a higher level, the selection of specific processing tools or steps from among the available options and the application of these tools in a specific sequence are both choices that the data processor must make. Here too, the optimal choices will likely differ among different CSEM surveys.

FIG. 4 depicts many CSEM processing steps, but not necessarily all the steps that would be required for specific data sets. In particular, quality control steps such as visually inspecting data and steps of data re-formatting are left out. Some metadata has been indicated explicitly. Receiver geometry, for example, includes the physical configuration and lengths of the electric and magnetic field antennae. Other metadata, such as the start and end times of particular tow lines, are not shown. Specific steps and their preferred order will vary from project to project.

CSEM surveys can be large and complex. For example, a survey might involve 10 or more tow lines, 90 receivers, and 10 or more discrete frequencies (in the frequency spectrum of a complex source waveform). Therefore, the data processor faces a bookkeeping challenge to ensure that all of the data have been processed consistently and accurately. Additional challenges arise when a group of data processors with varying levels of experience and expertise must coordinate their efforts to efficiently handle multiple data processing projects, as when individuals take vacation or must be devoted to other tasks.

Several published sources have recognized the need to apply particular processes to CSEM data (Ellingsrud, et al., "Remote sensing of hydrocarbon layers by seabed logging (SBL): results from a cruise offshore Angola", *The Leading Edge* 21, 972-982, (2002); MacGregor, et al., "The RAMESSES experiment-III. Controlled-source electromagnetic sounding of the Reykjanes Ridge at 57°45'N, *Geophys. J. Int.* 135, 773-789 (1998); Spies and Frischknecht, "Electromagnetic Sounding", in Electromagnetic methods in Applied Geophysics, Vol. 2, M. N. Nabighian ed., Society of Exploration Geophysicists, 285426 (1991); and UK Patent Application GB 2,415,511 to Amundsen and Holvik, "Processing Electromagnetic Data", (2005)). However, the problem of efficient and accurate CSEM data processing has received little attention in the literature. At least one early author has lamented the lack of standardized processing tools and the immaturity of CSEM processing methods (D. Proubasta, "Electromagnetics in Petroleum Prospecting", *The Leading Edge* 2, 3640, (1983)).

James Behrens developed a CSEM processing system called SFT6 (J. P. Behrens, "The Detection of Electrical Anisotropy in 35 Ma Pacific Lithosphere: Results from a Marine Controlled-Source Electromagnetic Survey and Implications for Hydration of the Upper Mantle", Ph.D. Thesis, University of California, San Diego, 2005). These tools are based on CSEM processing techniques used in earlier academic experiments. SFT6 was developed by Behrens as part of several projects, including NSF-funded projects. The SFT6 system (FIG. 5) is a collection of stand-alone tools whose processing parameters and I/O paths are hard-wired. Thus, the data processor must edit the source code to change processing parameters. The SFT6 system does not contemplate data normalizations of the types described in equations (2-5). The normalization method of equation (1) is implemented in the SFT6 tool sft6plot.m. SFT6 does contemplate different receiver data formats, as evidenced by the distinct tools sft6.m and sft6elf.m indicated in FIG. 5. However, because of its hard-wired processing parameters and the absence of consistent internal data formats, the SFT6 system does not provide a platform to process large amounts of CSEM data rapidly and efficiently or to easily incorporate and test new processing techniques.

The execution of multiple steps as parts of an overall seismic data processing flow to be applied to large quantities of seismic field data has been recognized for some time. An example is given on page 56 of "Seismic Data Processing" by Özdoğan Yilmaz (Society for Exploration Geophysicists (1987)). Computer programs ("executors") to create such processing flows and carry them out on both serial and parallel computers are available in commercial products such as the Omega product available from WesternGeco, 300 Schlumberger Drive, Sugar Land, Tex., the Promax product available from Landmark, 2101 CityWest Blvd, Houston, Tex., and the Geocluster product, available from Compagnie Générale de Geophysique, 16430 Park Ten Place, Houston, Tex. As suggested by FIG. 4, the steps in a processing flow correspond to specific processing algorithms or tools available within the executor. Similar concepts are embedded in free software available under limited license, such as Seismic Un*x (J. W. Stockwell, "The CWP/SU: seismic Un*x package", *Computers and Geosciences* 25, 415-419, (1999)) and in academic software, such as SIA (I. B. Morozov and S. B. Smithson, *Computers & Geosciences* 23, 689-606 (1997) and I. B. Morozov, *Computers & Geosciences* 24, 285-288 (1998)). See also "Integrated Software Framework for Processing of Geophysical Data," Chubak and Morozov, *Computers and Geosciences* 32, 767-775 (2006).

Seismic executors, in turn, embody features not previously known in marine CSEM processing software:
graphical user interfaces to specify tools and flows, control their execution, and to examine and catalog their results. This graphical user interface may consist of windows, buttons, menus, and other widgets to control the operation of the software;
a mechanism to accommodate new processing tools, without editing (and thereby risking damage to) the executor code. The same or similar mechanisms can be used to access new tools for development, testing, or production use and to ensure access to older versions of tools;
standardized file and directory structures to organize raw, synthetic, laboratory, and processed data, metadata, and flows. Standardized structures decrease the risk of processing errors, simplify the operation of the computer program, and enable different individuals to more effectively collaborate in the processing effort;
mechanisms to process data on parallel computers, decreasing the overall processing time required by distributing processing tasks among multiple CPUs;
standardized, common data formats, so that data can flow through tools in different orders (as part of different flows), data supplied by outside parties can be incorporated into a project, and processed data can be passed on to interpretation or inversion systems; and,
documentation, in the form of Help Files on specific tools as well as information on using the system itself.

Some data processing problems have been addressed in both CSEM and seismic software systems. Specifically, both systems provide means to:
reconcile final geometry (navigation) data with source and receiver data based on timing information. In both types of processing, raw navigation measurements must undergo additional analysis after the source and receiver data have already been recorded. Tools of this type must take particular care to handle surveys that were acquired across year-end and leap-day boundaries;
graphically display the action of processing tools on data. This feature is distinct from the Graphical User Interface; and,
achieve portability across different computer hardware platforms and operating systems.

SUMMARY OF THE INVENTION

In one embodiment, the invention is a method for processing data from a controlled-source electromagnetic survey of a subsurface region, comprising:
(a) selecting a data gather from the survey data;
(b) reading the selected gather of data into a computer's memory;
(c) partitioning the selected data gather into time bins, and transforming the data, bin-by-bin, to the temporal frequency domain, using a spectral decomposition software program ("tool") installed on the computer;
(d) writing the frequency domain data for the selected gather in a pre-selected internal data format to a data storage device;
(e) selecting a frequency component of the transformed data;
(f) selecting a data processing or manipulation tool (the "second tool") from among a plurality of such tools that are installed on the computer and applying the second tool to the selected data component; and
(g) writing the output of the second tool in said pre-selected internal data format to a data storage device;
wherein the spectral decomposition tool and the second tool are adapted to apply to data that are formatted in said pre-selected internal data format.

In another embodiment, the invention is a computer program for carrying out the above-described method.

BRIEF DESCRIPTION OF THE DRAWINGS

The present invention and its advantages will be better understood by referring to the following detailed description and the attached drawings in which.

Figure 1:
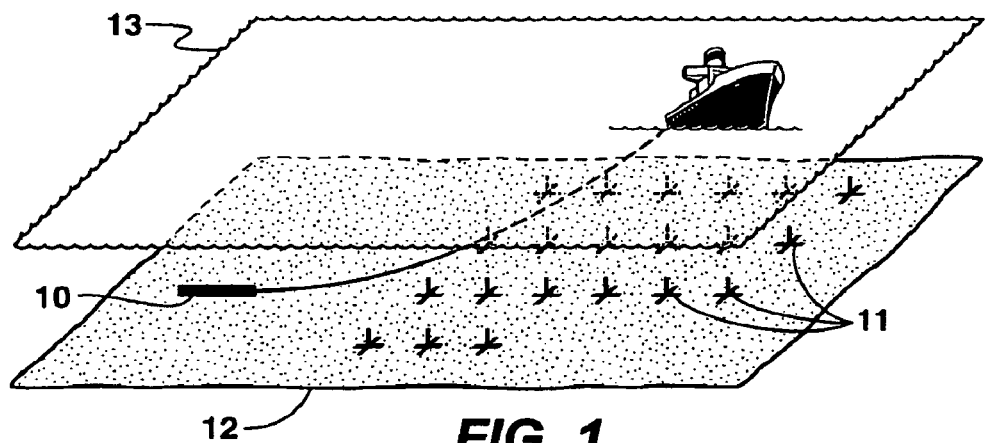
FIG. 1 illustrates deployment of equipment in a typical marine CSEM survey.
Figure 2A:
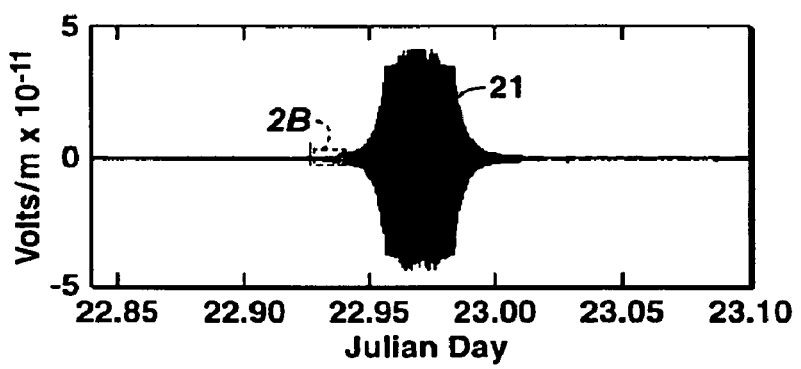
FIGS. 2A and 2B depict a received CSEM signal and the transmitter waveform that gave rise to it as functions of time.
Figure 2B:
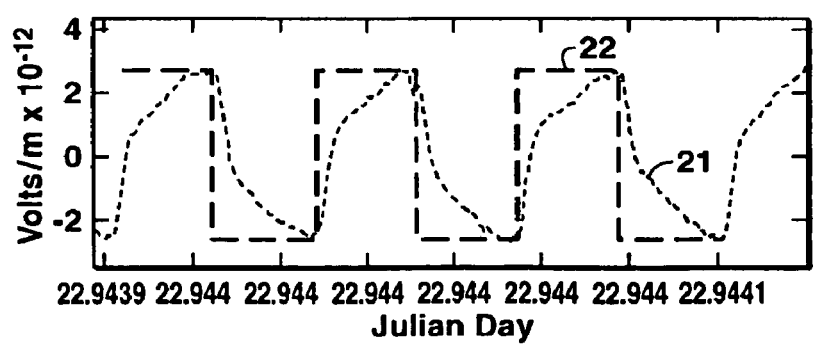
Figure 3A:
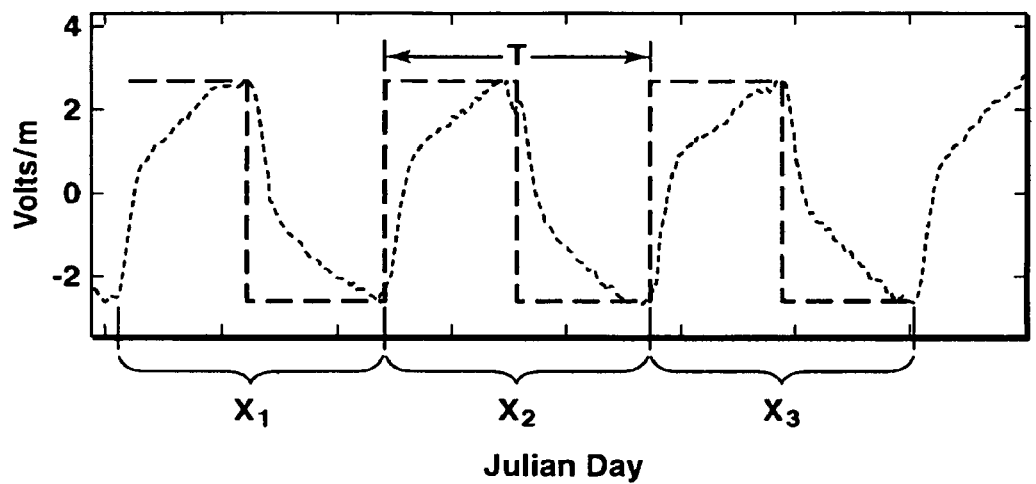
FIGS. 3A and 3B illustrate the process of binning a receiver signal in time and determining the frequency spectrum within each time bin by Fourier analysis.
Figure 3B:
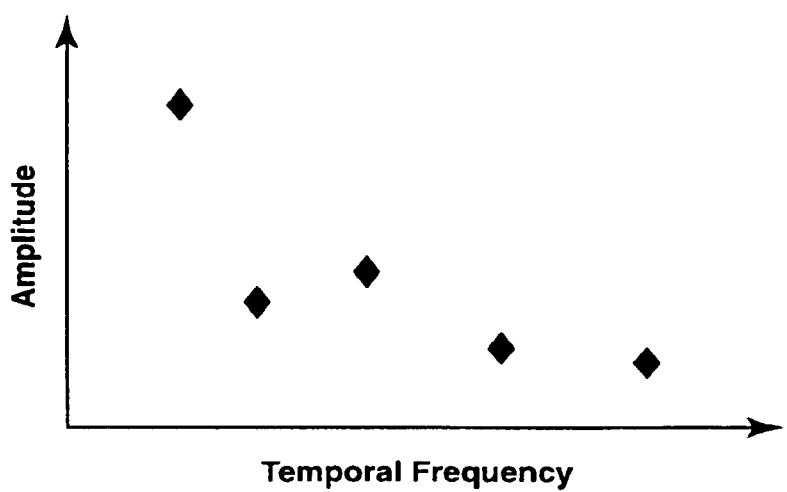

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is a method and computer program for accepting CSEM source and receiver data as time series, transforming these data into the time-frequency domain, and reducing these data and survey metadata to a form suitable for interpretation or inversion. The invention includes:

a number of processing tools or programs, each designed to take a specific action on CSEM data or metadata, combine data types in some way, and/or provide a visual representation of data (Table 1);

a Graphical User Interface (FIG. 6) to specify the action of specific tools on specific data, supply parameters to tools, and monitor progress of the processing project; and, a specified common internal data format, so that processing tools may be applied in various orders during different processing flows and processed CSEM data can be passed on to interpretation or inversion systems.

Table 1 shows examples of processing tools. In the table and in preferred embodiments of the invention, these tools are organized into categories and sub-categories to aid the data processor in selecting tools for the processing flow. The further association in this table of the processing tool with the software module or executable file that carries out the action of the tool and with the documentation or Help file that describes its operation is important for preferred embodiments discussed below. Executable and help files with similar names would be further distinguished by obvious file extensions, such as .exe or .dll for executables and .hlp or .txt for help files.

TABLE 1

Some individual processing tools included within an example computer program of the present invention. The name of the executable file or module and help (or documentation) files are also indicated for each tool.

| Category | Sub-category | Tool Action | Module | Help file |
| --- | --- | --- | --- | --- |
| Rotation Angle | From Compass | From compass data | compass | Compass |
| Rotation Angle | From Polarization | From raw data | polarization | PolarizationAnalysis |
| Rotation Angle | From Polarization | From processed data | NewPolar | NewPolar |
| Rotation Angle | From Magnetic Data | From processed data | MagPolar | MagPolar |
| Rotation Angle | From MT Signal | MT coherency analysis | MTcoherency | MTcoherency |
| Data Processing | Process Data Interactively | Spectral decomposition | SpecDecomp | SpectralDecomposition |
| Data Processing | Process Data Interactively | Phase and amplitude corrections | CACP | PhaseAndAmplitude |
| Data Processing | Process Data Interactively | Stack data | Stack | Stack |
| Data Processing | Process Data Interactively | Rotate data | Rotate | RotateReceivers |
| Data Processing | Process Data Interactively | Magnetotelluric noise suppression | MTSuppress | MTSuppress |
| Data Processing | Process Data Interactively | Determine time shifts from frequency scaling | MagicPhase | MagicPhase |
| Data Processing | Process Data Interactively | Merge navigation data from new format | NewNavMerge | MergeSourceGeometry |
| Data Processing | Process Data Interactively | Prepare intermediate navigation data | OldNavPrep | OldNavPrep |
| Data Processing | Process Data Interactively | Merge navigation data from old format | OldNavMerge | MergeSourceGeometry |
| Data Processing | Process Data In Batch | Spectral decomposition | BatchSpecDecomp | BatchSpecDecomp |
| Data Processing | Process Data In Batch | Phase and amplitude corrections | BatchCACP | BatchPandA |
| Data Processing | Process Data In Batch | Stack data | StackBatch | BatchStack |
| Data Processing | Process Data In Batch | Merge navigation data from old format | OldMergeNavBatch | OldMergeNavBatch |
| Data Processing | Process Data In Batch | Apply time shift corrections | TimeShift | TimeShift |
| Data Processing | Process Data In Batch | Space Domain Filter | SpaceFilter | SpaceFilter |
| Data Processing | Process Data In Batch | Recursive Space Domain Filter | RecursiveSpaceFilter | RspaceFilter |
| Data Processing | Process Data In Batch | Wavelet Denoising | WaveletFilter2 | WaveletDenoise |
| Data Processing | Process Data In Batch | Dip Filter | BatchDipFilter | DipFilter |
| Data Processing | Process Data In Batch | Merge high/low gain channels | hilomerge | hilo |
| Time Series and Spectra | Time Series | View L-cheapo data | TSview | TSview |

TABLE 1-continued

Some individual processing tools included within an example computer program of the present invention. The name of the executable file or module and help (or documentation) files are also indicated for each tool.

| Category | Sub-category | Tool Action | Module | Help file |
|---|---|---|---|---|
| Time Series and Spectra | Time Series | View vendor A data | Aview | Aview |
| Time Series and Spectra | Time Series | Check segment continuity | TScontinuity | TScontinuity |
| Time Series and Spectra | Time Series | View many receivers in time | TSrawData | TSrawData |
| Time Series and Spectra | Spectra | View L-cheapo spectrum | TSspectrum | TSspectrum |
| Time Series and Spectra | Spectra | View vendor A spectrum | Aspectrum | Aspectrum |
| Utility | Geometry | Map receivers and tow lines | UTmapRXsTXs | UTmapRXsTXs |
| Utility | Geometry | QC navigation data in time | UTnavQCtime | NavQCtime |
| Utility | Geometry | QC navigation data in space | UTnavQC | NavQCspace |
| Utility | Geometry | Convert archaic navigation data to new format | OldNav2New | OldNav2New |
| Utility | Geometry | Show skin depths along tow line | ShowSkin | ShowSkin |
| Utility | Show Processed Results | showResults | UTshowResults | showResults |
| Utility | Show Processed Results | Plot cross section | UtcrossSection | UTXsection |
| Utility | Examine .bin files | Dump headers from .bin files | DumpHeaders | DumpHeaders |
| Utility | Examine .bin files | Examine timing | ShowTimes | ShowTimes |
| Utility | Plot survey timeline | Plot timeline | Uttimeline | Uttimeline |
| Utility | Plot survey timeline | Plot vendor A timeline | Atimeline | Atimeline |
| Utility | Plot Amplifier Response | Plot amp response | Utampresponse | Utresponse |
| Utility | Plot Amplifier Response | Individual data logger | Utdatalogger | Utlogger |
| Utility | SDF utilities | Merge Nav with SDF output | MergeNav2SDF | NavMerge2SDF |
| Utility | SDF utilities | Plot SDF files | PlotSDF | PlotSDF |
| Utility | SDF utilities | Append files, merge nav and output SDF | AppMrgeNav2SDF | AppMrgNav2SDF |
| Utility | SDF utilities | Rotate field components | RotateSDF | RotateSDF |
| Utility | SDF utilities | Update RX Orientations | UpdateRxOrientationInSDF | UpdateRxOrientationInSDF |
| Utility | SDF utilities | Plot cross section from SDF files | SDFcrossSection | SDFsection |
| Utility | SDF utilities | Rearrange data channels | SDFrearrange | SDFrearrange |
| Utility | SDF utilities | Compare Results (Same RX/TL) | compareSameRxSDF | compareSameRxSDF |
| Utility | SDF utilities | Edit SDF header entries | SDFheaderEdit | SDFheaderEdit |
| Utility | Manipulate receiver files | Split receiver binary files into pieces | binFileSplit | Utsplit |
| Utility | Manipulate receiver files | Glue receiver pieces back into binary files | binFileUnSplit | Utsplit |
| Utility | Manipulate receiver files | Salvage flawed receiver binary files | CopySegments | Utcopy |
| Utility | Transmitter Waveform | View waveform | UTviewTXWaveform | UTviewTXWaveform |
| Utility | Transmitter Waveform | View spectrum | UtcomputeIPhi | UtcomputeIPhi |
| Utility | Transmitter Waveform | Determine phase and current | UtpickIPhi | UtpickIPhi |
| Utility | Transmitter Waveform | Convert source log files to one file | UTconvertLOGtoBIN | UTconvertLOGtoBIN |
| Utility | Contractor A | Set up tables and calibration files | Asetup | Asetup |
| Utility | Contractor A | Convert source current to IRIS BIN file | Aformat2Bin | Acurrent |
| Utility | Contractor A | Convert navigation files to internal format | NavA2R3M | ConvertNavA |
| Utility | Contractor A | Determine source spectrum | GrabSpectrum | Asourcespectrum |
| Utility | Contractor A | Batch spectral decomposition | AspectralDecomp | AspectralDecomp |
| Utility | Contractor A | Merge duplicate channels | AchannelMerge | AchannelMerge |
| Utility | Air waves | Subtract air wave response | AirWaveSubtract | AirWaveSuppression |
| Modeling | 1-D forward modeling | Edit model | Edit_model | EM1d |
| Modeling | 1-D forward modeling | Run model | Run_model | EM1d |
| Modeling | 1-D forward modeling | Plot model | Plot_model | EM1d |
| Modeling | 1-D forward modeling | Compare models | Compare_models | EM1d |
| Modeling | 1-D forward modeling | Synthesize air-wave response | AirWaveSynth | AirWaveSuppression |

TABLE 1-continued

Some individual processing tools included within an example computer program of the present invention. The name of the executable file or module and help (or documentation) files are also indicated for each tool.

| Category | Sub-category | Tool Action | Module | Help file |
|---|---|---|---|---|
| Inversion | 1-D Inversion | Prepare inversion input file | prepInvInputFile | prepInvInputFile |
| Inversion | 1-D Inversion | View inversion results | viewInvResults | viewInvResults |
| Inversion | 1-D Inversion | Merge inversion input files | MergeInvFiles | MergeInv |
| Inversion | 1-D Inversion | Modify inversion input file | ModifyInvFile | ModifyInv |

Figure 6:
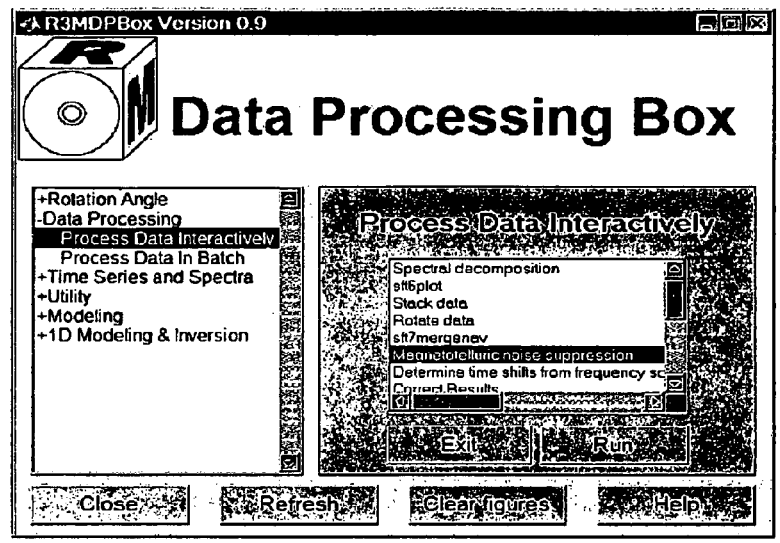
FIG. 6 shows an example of a Graphical User Interface display in the present invention.

One implementation of the Graphical User Interface is shown in FIG. 6. Individual processing tools are selected and executed from the menu at right, which shows all the tools available within a sub-category. Tool sub-categories are further organized into higher-level categories and can be selected from the menu at left. Interface buttons along the bottom allow the user to exit the system, update system configuration information, remove plots that are no longer needed, and access documentation for the tools and the overall system. In a preferred embodiment described below, this interface is created dynamically when the invention begins execution.

Figure 4:
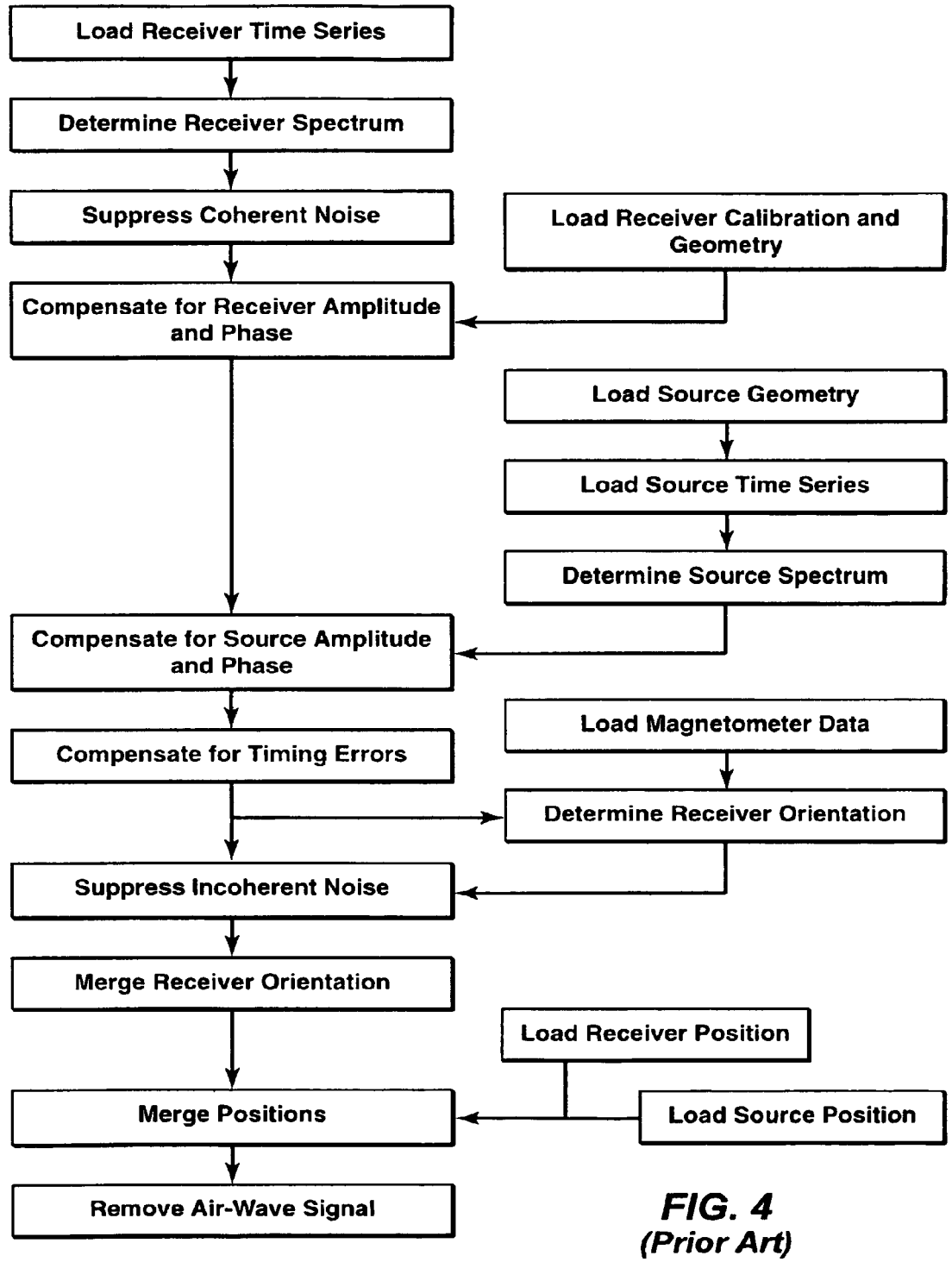
FIG. 4 is a high-level flow chart showing CSEM data processing steps that might typically be available.
Figure 5:
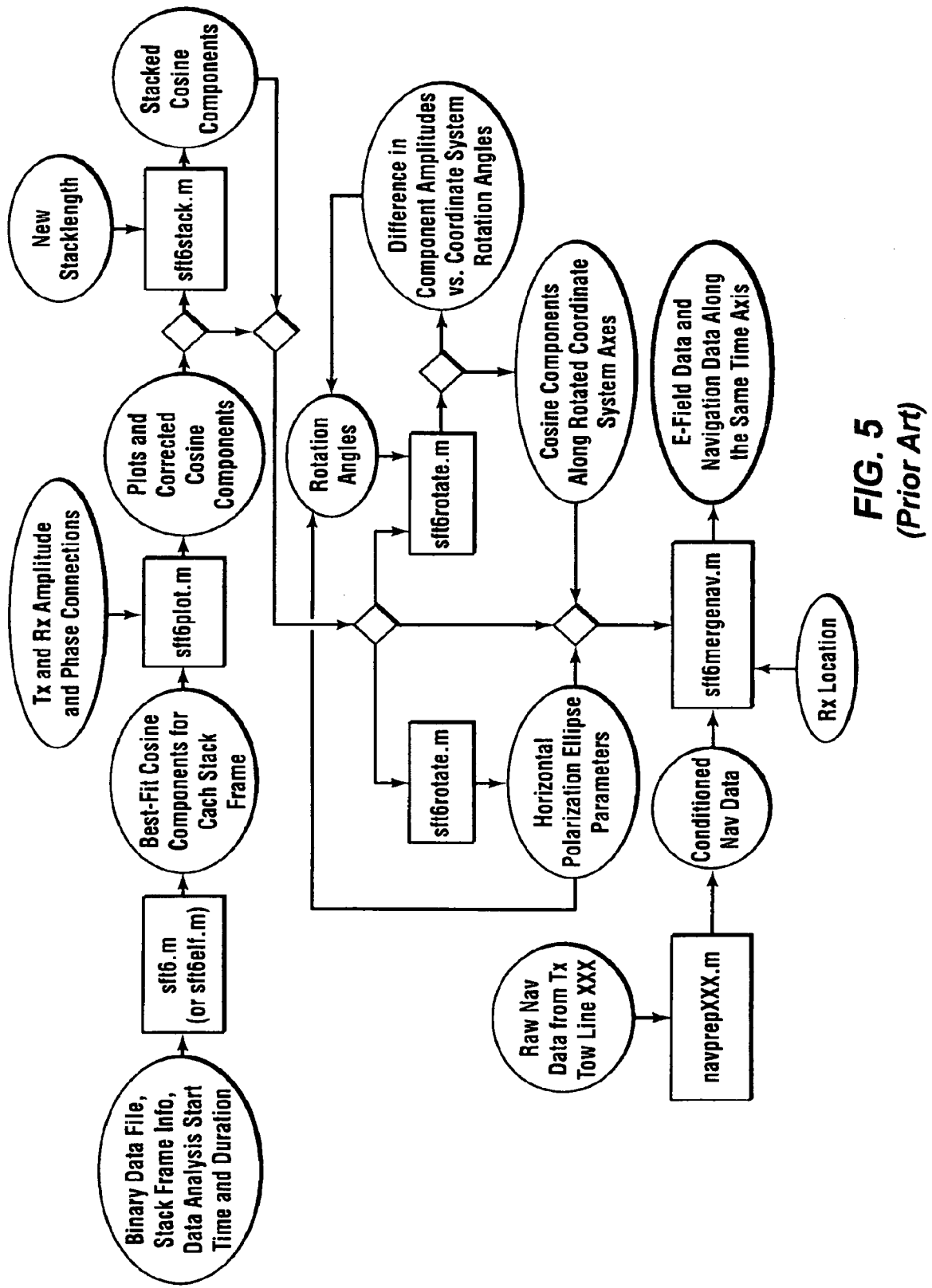
FIG. 5 is a flowchart showing processing routines and flow in a particular prior art system.

In the present invention, clearly defined internal data formats simplify the error-free movement of data among tools such as those in FIG. 4, permit tools to be flexibly inserted into flows in different ways, and simplify the transfer of processed data to inversion and interpretation software. This standardization furthermore defines a target format for bringing data produced by outside parties such as geophysical contractors into the processing system. Geophysical contractors supply data and metadata in a variety of external data formats, including the L-cheapo format developed by Scripps Institute of Oceanography, the Scapi and Time Series formats developed by Electromagnetic Geoservices AS, and the CSV format developed by OHM Ltd.

Table 2 gives examples of data and metadata values that are to be specified in the internal data format. Each data value may have additional attributes, such as type (character, integer, or floating point) and dimension (scalar, vector, matrix, etc). These data may be referred to by different names in some implementations. The specific organization of CSEM data into files will depend broadly on the type of data and more specifically on the implementation as a computer software library. However, in many embodiments of the invention, the internal format will organize these values into Header blocks and Data blocks, the Header blocks containing relatively small amounts of data that apply to larger amounts of data stored in the Data blocks. For example, the receiver position may be stored in a Header block while the Data block contains the receiver's time-frequency domain signal, source locations, or an earth conductivity model associated with that receiver. In particular, in preferred embodiments of the invention the data set in the internal format will minimally contain spectral components of the electric and/or magnetic field together with a specification of the data bins by time and/or by offset (TIME_FREQUENCY_DATA). In addition, such an internal format will minimally specify the frequencies present in that spectrum, such as by specifying elements (FREQ_INDEX) from a list of possible frequencies (FREQ_LIST). The data set will further specify the number of bins, the number of vector components, and the number of bin specification entries present (DATA_MAX_DIMENSIONS) as well as specifying which vector components of the electric or magnetic fields are present (DATA_COMPONENTS). The number of bin specification entries present refers to the previously mentioned fact that bins may be redundantly labeled by, among other things, time, offset, and source position; it can be useful for the format to indicate how many redundant labels are present. In the case of a common-receiver gather, the data set will further identify the seafloor location of the receiver (RECEIVER_STN_NAME). In many embodiments, a set of software tools (or software library) will be created to implement basic operations on files in the internal format. Such operations might include:

reading a file;
writing a file;
creating or updating Header values;
creating or updating Data values; and,
checking for the existence of Header or Data values.

TABLE 2

| | |
|---|---|
| MODEL_CUBE_NUMBER | Data |
| DATA_ITEMS_COUNT | Data |
| DATA_LINE_INDEX | Data |
| DATA_VALUE_TYPE | Data |
| DATA_MULTIPLICITY | Data |
| FREQ_INDEX | Data |
| TIME_FREQUENCY_DATA | Data |
| SEQUENCE_NUMBER | Data |
| GRID_AXIS1_NODES | Header |
| GRID_AXIS2_NODES | Header |
| GRID_AXIS3_NODES | Header |
| MODEL_LAYER | Header |
| MODEL_ANISOTROPY | Header |
| LINE_NAME | Header |
| SOURCE_LINE_INDEX | Header |
| RECEIVER_LINE_INDEX | Header |
| DATA_COMPONENTS | Header |
| FREQ_LIST | Header |
| LINE_ORIGIN_LOCN | Header |
| LINE_AZIMUTH | Header |
| LINE_START | Header |
| LINE_ANTENNA_TYPE | Header |
| LINE_ANTENNA_LENGTH | Header |
| LINE_SOURCE_CURRENT | Header |
| LINE_SOURCE_PHASE | Header |
| LINE_SOURCE_PERIOD | Header |
| LINE_SOURCE_MODEL | Header |
| LINE_SOURCE_ID | Header |
| RECEIVER_CONTRACTOR | Header |
| SOURCE_CONTRACTOR | Header |
| NAVIGATION_CONTRACTOR | Header |
| SURVEY_AREA | Header |
| SURVEY_NAME | Header |
| MODEL_NAME | Header |
| SURVEY_START_DATE | Header |
| DATA_SOURCE | Header |
| LOCN_COORDINATES | Header |
| GEODETIC_SYSTEM | Header |
| GEODETIC_PARAMETERS | Header |
| COORDINATE_POLARITY | Header |
| HISTORY | Header |
| COMMENT | Header |
| PRIMARY_SORT_ATTRIBUTE | Header |
| SECONDARY_SORT_ATTRIBUTE | Header |
| DATA_MAX_ITEMS | Header |
| DATA_MAX_DIMENSIONS | Header |
| DATA_INCREMENT | Header |

TABLE 2-continued

| | |
|---|---|
| DATA_MIN_COORD | Header |
| DATA_NULL | Header |
| APPLIED_TIME_SHIFT | Header |
| RECEIVER_STN_NAME | Header |
| RECEIVER_AZIMUTH | Header |
| RECEIVER_PITCH | Header |
| RECEIVER_ROLL | Header |
| MODEL_DATA_DIMENSION | Header |
| MODEL_SOURCE_LAYER | Header |
| MODEL_IMAG_CONDUCTIVITY | Header |
| MODEL_REAL_PERMITTIVITY | Header |
| MODEL_REAL_PERMEABILITY | Header |
| SOURCE_ANTENNA_INDEX | Header |
| SOURCE_ANTENNA_SHAPE | Header |
| SOURCE_ARRAY_NAME | Header |
| SOURCE_ANTENNA_MAX | Header |
| SOURCE_ANTENNA_COUNT | Header |
| SOURCE_ANTENNA_TYPE | Header |
| SOURCE_ANTENNA_SIZE | Header |
| SOURCE_ANTENNA_CURRENT | Header |
| SOURCE_ALTITUDE | Header |
| SOURCE_AZIMUTH | Header |
| SOURCE_PITCH | Header |
| RECEIVER_RECORD_START | Header |
| RECEIVER_RECORD_FINISH | Header |
| RECEIVER_CLOCK_DRIFT | Header |
| RECEIVER_MODEL | Header |
| RECEIVER_CHASSIS | Header |
| RECEIVER_ID | Header |
| RECEIVER_ANTENNA_MAX | Header |
| RECEIVER_ANTENNA_COUNT | Header |
| RECEIVER_ANTENNA_TYPE | Header |
| RECEIVER_ANTENNA_SIZE | Header |
| RECEIVER_ANTENNA_GAIN | Header |
| RECEIVER_ANTENNA_INDEX | Header |
| RECEIVER_ANTENNA_SHAPE | Header |

Figure 7:
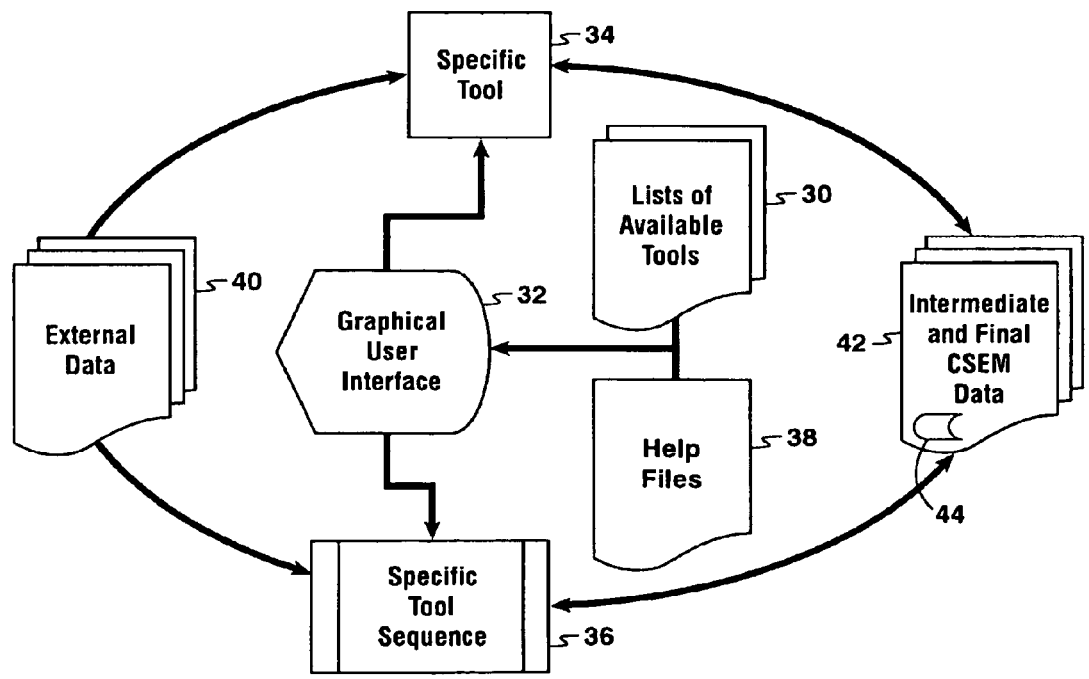
FIG. 7 is a flow chart showing basic components and data flow for one embodiment of the present invention.

FIG. 7 is a schematic diagram of one embodiment of the present invention, with arrows indicating some possible directions of data flow. In this drawing, the Lists of Available Tools 30 provide a mechanism for organizing processing tools into logical categories and for adding new tools and categories. The Graphical User Interface 32 provides a means of viewing data, selecting and causing the execution of a tool 34 or sequence of tools 36, setting tool parameters, and accessing Help documentation 38. External Data 40 represents data supplied from the field and/or laboratory, possible in alternative formats. Intermediate and Final CSEM Data 42 are generally common-receiver CSEM gathers, but may include other work products—such as electronic copies of computer displays. When present, Data Dictionaries 44 define the contents and digital representations of the Intermediate and Final CSEM Data. The diagram distinguishes between external data, which are (usually) only read once by the computer program and intermediate CSEM data which are (usually) written and read more than once depending upon which tools are chosen for execution. In general, tools may process a single data set or multiple data sets during a single invocation. The (one or more) common internal data format is not indicated on this drawing.

Specific features to be found in some but not all embodiments of the present invention include the following:

The internal data format is documented in data dictionaries which specify the data object, its type (character, integer, floating point, complex), its size in bytes, its default value, its location (Header or Data), and its dimensions. The format of these data dictionaries is itself prescribed. These data dictionaries can be modified and are accessible to the invention. It is therefore possible to add header and data values to the formats and have them recognized by the invention.

Users of the invention may add new data dictionaries as part of testing new processing tools or to include additional information not described in existing data dictionaries.

The data dictionaries may themselves be written to the intermediate and final CSEM data files, thereby making these files "self-defining" to the invention.

The invention may enable the user to access documentation, in the form of Help files describing the use of specific tools or of the invention itself;

Processing tools are organized by category and sub-category to permit the user to find tools quickly and to compare tools that implement operations by different methods.

As indicated in Table 1, the processing tools are linked (preferably, in an editable and readable file) to their category, sub-category, action, executable file or subroutine, and help file. The invention preferably accesses this linked information at program startup, prior to constructing the menus in its Graphical User Interface, thereby providing the user with up-to-date tools and documentation without any need for recompiling or rebuilding the invention itself.

If provided, the invention may recognize a second table, analogous to Table 1, in which additional tools and/or newer versions of existing tools are specified. The invention takes this second table into account while constructing its menus, thereby facilitating the development and debugging of new or updated tools without recompiling or rebuilding the invention itself.

The software supports processing flows, which means the user may cause several processing tools to execute in a particular sequence with no further direction or intervention beyond designing and initiating the flow.

Processing flows can themselves be captured and stored as computer files for later re-use and modification. This mechanism also permits standardized, debugged flows to be shared among multiple users.

Figure 8:
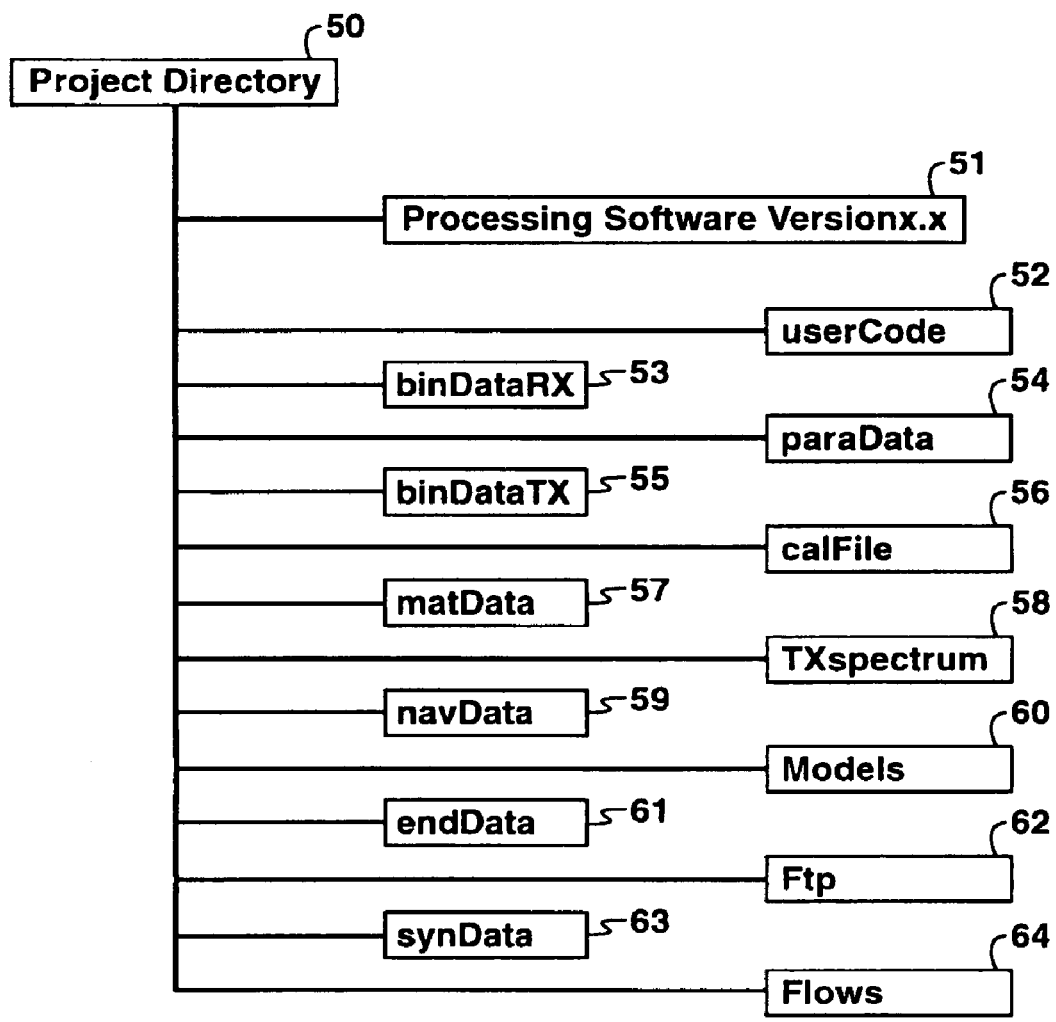
FIG. 8 shows a file directory structure for one embodiment of the present invention.

The Graphical User Interface provides a graphical mechanism for designing processing flows, wherein processing tools are represented, for example by boxes and data paths by lines connecting the boxes, as in FIG. 4, and for translating the graphical representation into readable computer files;

A directory structure such as that shown in FIG. 8 is specified to organize raw, synthetic, laboratory, and processed data, monitor the progress of that data through the processing flow, and access both production and prototype processing tools. By standardizing data types and locations, this directory structure minimizes errors and the likelihood of information being lost. The structure assists users by providing a common language for sharing expertise and collaborating on processing projects. By simply saving the entire directory structure to computer tape, it provides a simple way to archive a completed processing project and a transparent basis for users to re-process archived projects. Furthermore, it is general enough to allow programmers and users to create additional subdirectories or parallel directories. These additional directories might be used to capture the results of alternative processing flows or to accommodate new contractor-supplied data types or formats. In FIG. 8, the Project Directory 50 is the root directory or folder used to distinguish the processing project from other projects. Read-write permissions can be set to avoid the inadvertent mixing of proprietary data among projects. The Processing Software Versionx.x directory 51 contains the processing software, tools, help files, and default data dictionaries that are part of the invention. Other versions of the software can be installed in parallel directories (not shown) as part of software testing or because the software has been upgraded during the course of the project. The userCode directory 52 contains additional processing tools not present in 51 along with the Lists of Available Tools 30 and any additional data dictionaries required to use them. Receiver time series and metadata are contained in the binDataRX directory 53. The paraData directory 54 contains survey metadata such as the receiver locations and configurations and the tow line start and end times. Transmitter time series and metadata are contained in the binDataTIX directory 55. The calFile directory 56 contains laboratory calibration data for each receiver. Raw data types from different contractors can be accommodated as subdirectories (not shown) under 53, 55 and 56. The matData directory 57 contains intermediate processed data sets. The TXspectrum directory 58 contains metadata describing the transmitter spectrum. The navData directory 59 contains positioning metadata for the transmitter. The Models directory 60 contains earth resisitivity models appropriate for forward simulating CSEM data. These models may optionally be generated by inverting CSEM data. The endData directory 61 contains final, processed CSEM data. The Ftp directory 62 contains raw data or data fragments sent by contractors. Fragments of receiver time series might be stored here, for example, prior to being reassembled in the binDataRX directory 53. The syndata directory 63 contains synthetic CSEM data generated from earth resisitivity models such as those contained in 60. The Flows directory 64 contains digital representations of processing flows.

The invention supports data processing for any combination of electric and magnetic receivers and electric and magnetic sources.

The user controls the naming of both intermediate and final data sets during the operation of the invention. This provides a convenient mechanism both for a user to quickly check the progress of the CSEM processing project and to indicate the results of testing tools or parameter values.

In summary, the user of the present invention is able to do, among other things, the following:

reduce field measurements to a form suitable for interpretation or inversion;

manipulate data, tools, and flows efficiently;

suspend and restart processing while retaining intermediate results;

ensure that data have been processed completely and accurately;

select from among a suite of processing tools;

accept survey data in various digital formats such as provided by different geophysical contractors;

judge the efficacy of specific flows, tools, and tool parameters;

visually inspect the output of any tool or flow;

repair or overcome errors in field data; and, access documentation, both on the technical details of specific tools and overall use of the system.

A system according to the present invention:

provides a standardized platform that implements reliable procedures and processing practices;

can be easily maintained as computer hardware, software libraries, and operating systems are changed;

can be readily enhanced to accommodate new processing concepts or computer capabilities; and, can easily accommodate prototype tools and flows, such as might be developed during the course of CSEM research.

The present invention can be practiced on computers running any of several operating systems, such as Unix, Linux, operating systems marketed by Microsoft Inc., or operating systems marketed by Apple Computer Inc. Typically, the invention would be implemented using a combination of one or more computer languages and libraries selected to simplify the programming task, to optimize performance of both the graphical and numerical algorithms, and to simplify porting the system among hardware platforms and operating systems. For example, for graphics-intensive portions of the program, the programmer might select the Matlab product marketed by The MathWorks Inc., the Qt product marketed by Trolltech, the Visual Basic product marketed by Microsoft Inc., or the Motif toolkit, available from several computer manufacturers. For numerically-intensive portions of the program, the programmer might select either the Fortran or C programming languages. For parallel applications, the programmer might select either the MPI or PVM message-passing libraries available from several computer manufacturers. For software to carry out the underlying program logic, the programmer might select the C, C++, or Matlab programming languages.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for processing data from a controlled-source electromagnetic survey of a subsurface region, comprising:
    (a) selecting a data gather from the survey data;
    (b) reading the selected gather of data into a computer's memory;
    (c) partitioning the selected data gather into time bins, and transforming the data, bin-by-bin, to the temporal frequency domain, using a spectral decomposition software program, called the spectral decomposition tool, installed on the computer;
    (d) writing the frequency domain data for the selected gather in a pre-selected internal data format to a data storage device;
    (e) selecting a frequency component of the transformed data;
    (f) selecting a data processing or manipulation tool, called the second tool, from among a plurality of such tools that are installed on the computer and applying the second tool to the selected data component, wherein all of said plurality of such tools are adapted to read input data and write output data in said preselected internal data format, and wherein selection and execution of the second tool is made interactively by a user of the method on a graphical user interface; and
    (g) writing the output of the second tool in said pre-selected internal data format to a data storage device.

2. The method of claim 1, further comprising repeating steps (e)-(g) for at least one more frequency component of the transformed data.

3. The method of claim 2, further comprising repeating all steps for at least one more receiver gather from the survey data.

4. The method of claim 1, further comprising repeating steps (f)-(g) for at least one more data processing or manipulation tool installed on the computer and adapted to apply to data that are formatted in said pre-selected internal data format, each tool being applied to the selected data component as processed by the previous tool.

5. The method of claim 4, wherein before data is processed by the second or later tools, the data processed by previous tools are read into computer memory from the external storage device where the output of the last previous tool was written to.

6. The method of claim 4, wherein the interactive user's tool selection on the graphical user interface is based at least partly on viewing a display of processed results from a previously used tool.

7. The method of claim 1, further comprising assigning a name to each file written to a storage device, said name selected to reflect the file's processing history.

8. The method of claim 1, wherein a data storage device is any storage medium that retains stored data notwithstanding power interruption.

9. The method of claim 1, further comprising applying a data display tool installed on the computer to frequency domain data, said data display tool being adapted to apply to data that are formatted in said pre-selected internal data format.

10. The method of claim 1, wherein said second data processing or manipulation tool is selected from a group consisting of (i) a tool that stacks data; (ii) a tool that applies wavelet denoising to data; (iii) a tool that filters data; (iv) a tool that rotates electromagnetic field components; (v) a one-dimensional forward modeling tool; and (vi) a one-dimensional inversion tool.

11. The method of claim 1, further comprising before the first writing step, applying a tool installed on the computer that converts data files to the pre-selected internal data format.

12. The method of claim 1, wherein the pre-selected internal data format includes specification of (i) frequencies present in spectral decomposition of survey data; (ii) number of bins, number of vector data components, (iii) number of bin specification entries including redundant labels for data bins; and (iv) identification of which electromagnetic field components are present.

13. The method of claim 1, wherein the selected data gather is a common-receiver gather.

14. The method of claim 13, wherein the method is applied to results of a marine survey, and the pre-selected internal data format includes specification of seafloor location of the receiver.

15. The method of claim 1, wherein the selected data gather is a common-source gather.

16. A non-transitory computer readable medium for processing gathers of electromagnetic field data from a controlled-source electromagnetic survey of a subsurface region having computer readable program code embedded therein, said computer readable program code comprising:

(a) a spectral decomposition software tool for partitioning the electromagnetic field data into time bins, and transforming the data, bin-by-bin, to the temporal frequency domain;
(b) a software tool for converting survey data files to a pre-selected internal data format, said format including specification of at least (i) frequencies present in spectral decomposition of survey data; (ii) number of bins, number of vector data components; (iii) number of bin specification entries including redundant labels for data bins; (iv) identification of which electromagnetic field components are present; and (v) location of common acquisition element in the data gather;
(c) at least one more data processing or manipulation software tool, adapted to accept data and output data in the pre-selected internal data format;
(d) at least one data display software tool, adapted to be applied to data in the pre-selected internal data format; and
(e) a graphical user interface adapted to allow a user to interactively select and cause execution of data processing, manipulation or display tools included in the computer readable program code.

17. A method for producing hydrocarbons from a subsurface region, comprising:
(a) performing a controlled-source electromagnetic survey of the subsurface region;
(b) sending survey data to be processed by a method comprising:
(i) selecting a data gather from the survey data;
(ii) reading the selected gather of data into a computer's memory;
(iii) partitioning the selected data gather into time bins, and transforming the data, bin-by-bin, to the temporal frequency domain, using a spectral decomposition software program, called the spectral decomposition tool, installed on the computer;
(iv) writing the frequency domain data for the selected gather in a pre-selected internal data format to a data storage device;
(v) selecting a frequency component of the transformed data;
(vi) selecting a data processing or manipulation tool, called the second tool, that is installed on the computer and applying the second tool to the selected data component, wherein all of said plurality of such tools are adapted to read input data and write output data in said preselected internal data format, and wherein selection and execution of the second tool is made interactively by a user of the method on a graphical user interface; and
(vii) writing the output of the second tool in said pre-selected internal data format to a data storage device;
(c) drilling a well into a stratum in the subsurface region showing electrical resistivity in the processed data indicative of presence of hydrocarbons; and
(d) producing hydrocarbons from the well.

* * * * *